United States Patent
Ramirez et al.

(10) Patent No.: US 12,459,460 B2
(45) Date of Patent: Nov. 4, 2025

(54) VEHICLE SEAT BUCKLE ASSEMBLY

(71) Applicant: Ford Global Technologies, LLC, Dearborn, MI (US)

(72) Inventors: Monica Ramirez, Mexico City (MX); Fernando Ortega, Puebla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 582 days.

(21) Appl. No.: 17/932,676

(22) Filed: Sep. 16, 2022

(65) Prior Publication Data
US 2024/0092309 A1   Mar. 21, 2024

(51) Int. Cl.
| | |
|---|---|
| *B60R 22/03* | (2006.01) |
| *B60R 22/20* | (2006.01) |
| *B60R 22/02* | (2006.01) |
| *B60R 22/18* | (2006.01) |

(52) U.S. Cl.
CPC ............. *B60R 22/03* (2013.01); *B60R 22/20* (2013.01); *B60R 2022/021* (2013.01); *B60R 2022/1806* (2013.01)

(58) Field of Classification Search
CPC ......... B60R 22/03; B60R 22/20; B60R 22/02; B60R 22/023; B60R 2022/021; B60R 2022/1806
See application file for complete search history.

(56) References Cited

U.S. PATENT DOCUMENTS

| | | | |
|---|---|---|---|
| 6,550,867 B2 * | 4/2003 | Rogers, Jr. ............. | B60R 22/03 280/808 |
| 7,458,609 B2 * | 12/2008 | Gyllenspetz ............ | B60R 22/03 280/801.1 |
| 8,157,292 B2 | 4/2012 | You et al. | |
| 9,358,948 B2 | 6/2016 | Kim et al. | |
| 10,081,330 B2 | 9/2018 | Arnold et al. | |
| 10,399,538 B2 | 9/2019 | Hata et al. | |
| 11,897,416 B2 * | 2/2024 | Kim ....................... | B60R 22/03 |
| 2002/0043872 A1 * | 4/2002 | Townsend ............... | B60R 22/26 297/473 |
| 2006/0231317 A1 * | 10/2006 | Yamaguchi ............ | B60R 22/03 280/801.1 |

FOREIGN PATENT DOCUMENTS

JP         5102713 B2    12/2012

* cited by examiner

*Primary Examiner* — John D Walters
(74) *Attorney, Agent, or Firm* — Frank A. MacKenzie; Brooks Kushman P.C.

(57) ABSTRACT

A vehicle includes a seat having a seat bottom and a seatback. The vehicle includes a buckle movable from a retracted position at the seatback to a deployed position spaced from the seatback. The vehicle includes an actuator operatively coupled to the buckle to move the buckle from the retracted position to the deployed position. The vehicle includes a computer having a processor and a memory storing instructions executable by the processor to receive an indication that an occupant of the seat will exit the vehicle and, in response, command the actuator to move the buckle from the retracted position to the deployed position.

19 Claims, 7 Drawing Sheets

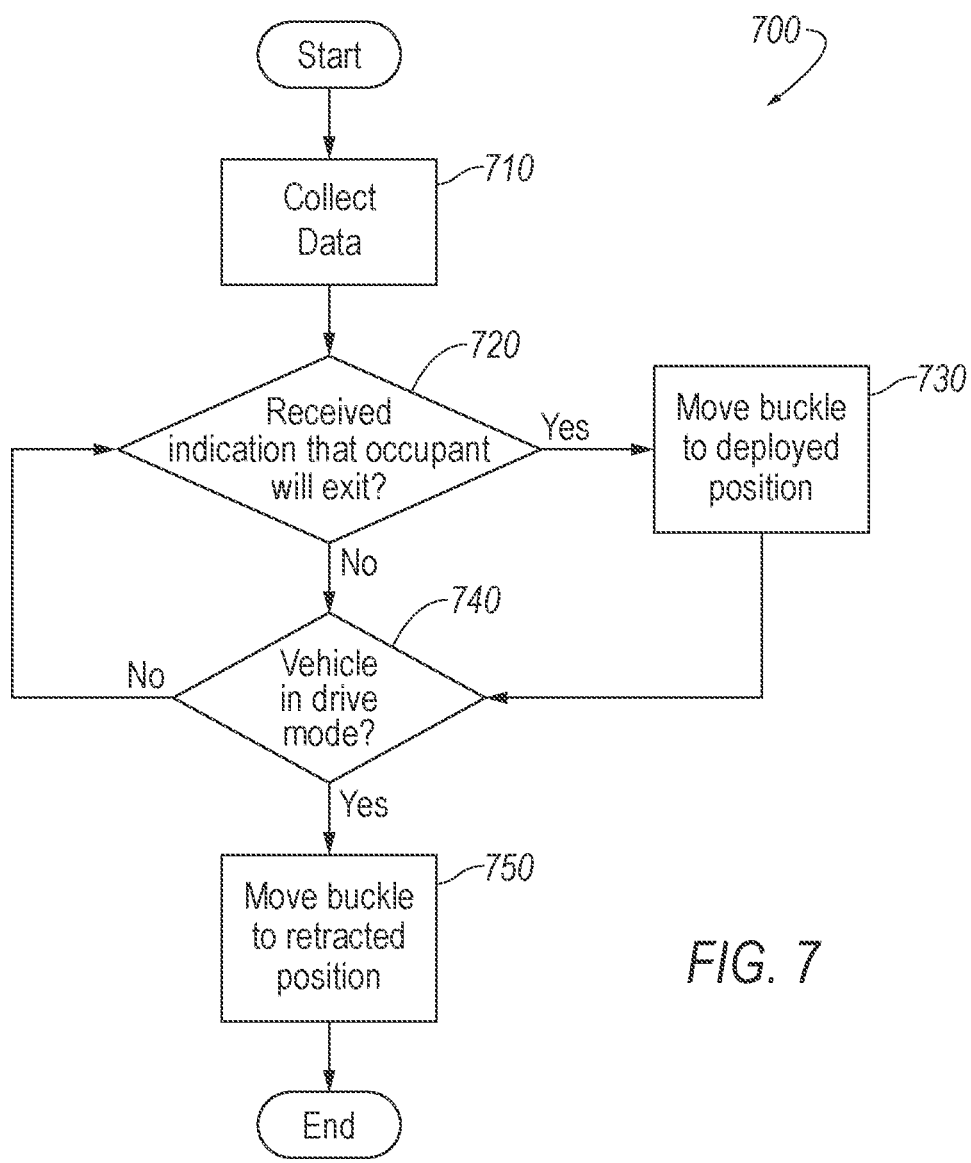

VEHICLE SEAT BUCKLE ASSEMBLY

BACKGROUND

Vehicles typically include one or more seatbelt assemblies. The seatbelt assembly may include a seatbelt retractor and a webbing retractably payable from the seatbelt retractor. The seatbelt assembly may include an anchor coupled to the webbing, and a clip that engages a buckle. The seatbelt assembly may be disposed adjacent a seat. The seatbelt assembly, when fastened, secures the driver or a passenger of a vehicle against movement that may result during a collision or a sudden stop. The seatbelt assembly may be a three-point harness, meaning that the webbing is attached at three points around the occupant. The seatbelt assembly may, alternatively, include another arrangement of attachment points.

BRIEF DESCRIPTION OF THE DRAWINGS

FIG. 7 is a flowchart showing method steps of controlling the buckle.

DETAILED DESCRIPTION

Figure 1:
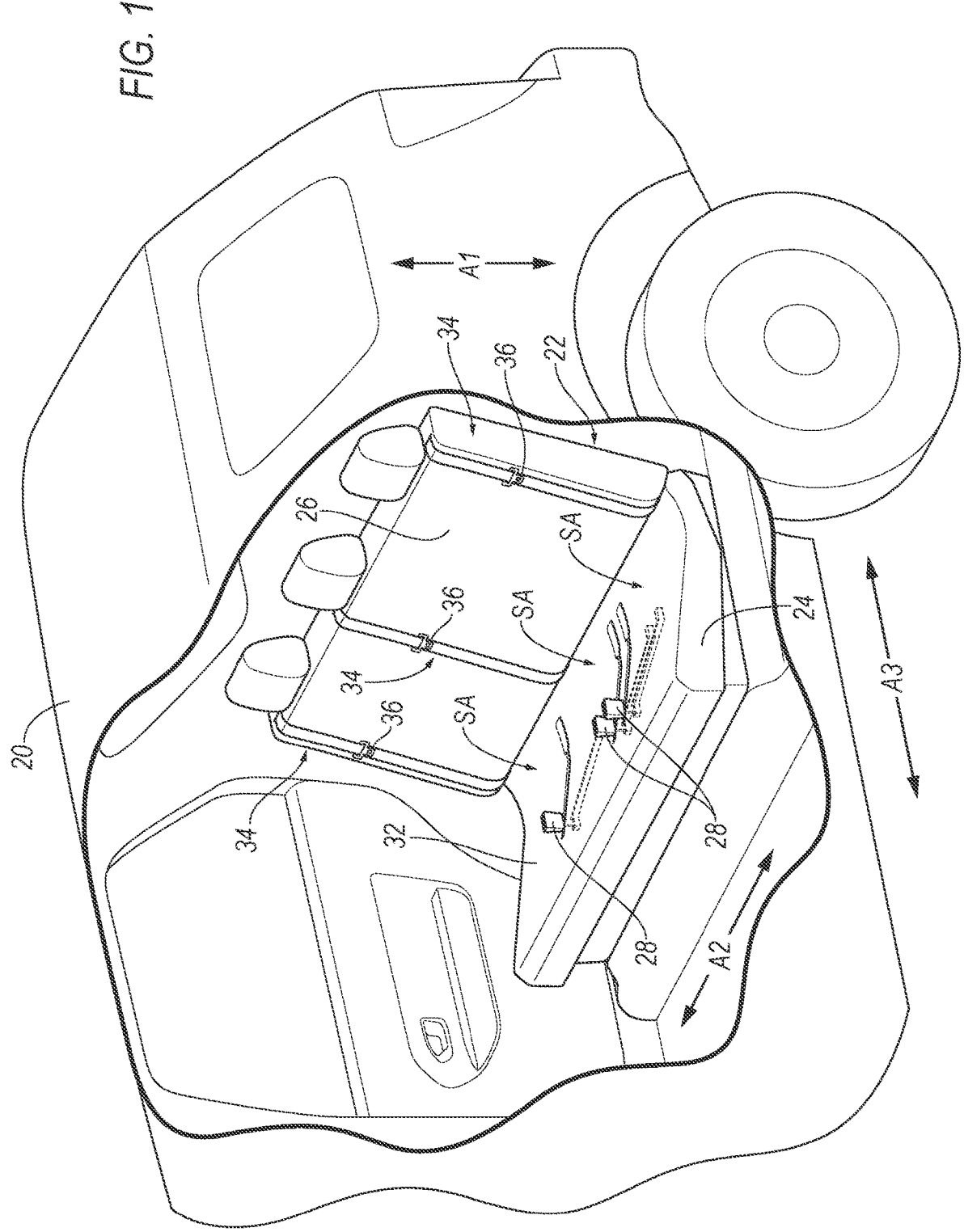
FIG. 1 is a perspective view a portion of a vehicle including seatbelt assemblies.

A vehicle includes a seat having a seat bottom and a seatback. The vehicle includes a buckle movable from a retracted position at the seatback to a deployed position spaced from the seatback. The vehicle includes an actuator operatively coupled to the buckle to move the buckle from the retracted position to the deployed position. The vehicle includes a computer having a processor and a memory storing instructions executable by the processor to receive an indication that an occupant of the seat will exit the vehicle. The instructions include instructions to, in response to receiving the indication that the occupant of the seat will exit the vehicle, command the actuator to move the buckle from the retracted position to the deployed position.

The vehicle may include a track elongated from a first end to a second end, the buckle at the retracted position being at the first end and the buckle at the deployed position being at the second end.

The first end may be below the second end relative to a seat-vertical axis.

The track may extend from the first end to the second end transverse to a seat-longitudinal axis and a seat-vertical axis.

The track at the first end and at the second end may extend parallel to the seat-longitudinal axis.

The track may extend from the first end away from the seatback to the second end.

The actuator may include a first gear at the first end, a second gear at the second end, and a belt engaged with the first gear and the second gear.

The buckle may be fixed relative to the belt.

The actuator may include a third gear at the first end, a fourth gear at the second end, and a second belt engaged with the third gear and the fourth gear.

The actuator may include a motor operatively coupled to both the first gear and the third gear to rotate both the first gear and the third gear.

The seat bottom may include a top surface and the buckle in the retracted position may be closer to the top surface of the seat bottom than in the deployed position.

The instructions may include instructions to determine that the vehicle is in a drive mode, and in response to determining that the vehicle is in the drive mode, command the actuator to move the buckle from the deployed position to the retracted position.

A vehicle includes a seat having a seat bottom and a seatback. The vehicle includes a buckle movable from a retracted position at the seatback to a deployed position spaced from the seatback. The vehicle includes a track elongated from a first end to a second end, the buckle at the retracted position being at the first end and the buckle at the deployed position being at the second end. The vehicle includes an actuator operatively coupled to the buckle to move the buckle from the retracted position to the deployed position, the actuator including a first gear at the first end, a second gear at the second end, and a belt engaged with the first gear and the second gear.

The first end may be below the second end relative to a seat-vertical axis.

The track may extend from the first end to the second end transverse to a seat-longitudinal axis and a seat-vertical axis.

The track at the first end and at the second end may extends along the seat-longitudinal axis.

The track may extend from the first end away from the seatback to the second end.

The buckle may be fixed relative to the belt.

The actuator may include a third gear at the first end, a fourth gear at the second end, and a second belt engaged with the third gear and the fourth gear.

The vehicle may include a computer having a processor and a memory storing instructions executable by the processor to receive an indication that an occupant of the seat will exit the vehicle. The instructions may include instructions to, in response to receiving the indication that the occupant of the seat will exit the vehicle, command the actuator to move the buckle from the retracted position to the deployed position. The instructions may include instructions to determine that the vehicle is in a drive mode. The instructions may include instructions to, in response to determining that the vehicle is in the drive mode, command the actuator to move the buckle from the deployed position to the retracted position.

With reference to the Figures, wherein like numerals indicate like parts throughout the several views, a vehicle 20 including a seat 22 having a seat bottom 24 and a seatback 26 is shown. The vehicle 20 includes a buckle 28 movable from a retracted position at the seatback 26 to a deployed position spaced from the seatback 26. The vehicle 20 includes an actuator 54 operatively coupled to the buckle 28 to move the buckle 28 from the retracted position to the deployed position. The vehicle 20 includes a computer 30 having a processor and a memory storing instructions executable by the processor to receive an indication that an occupant of the seat 22 will exit the vehicle 20 and in response to receiving the indication that the occupant of the seat 22 will exit the vehicle 20, command the actuator 54 to move the buckle 28 from the retracted position to the deployed position. Movement of the buckle 28 to the deployed position in response to receiving the indication that the occupant of the seat 22 will exit the vehicle 20 may present the buckle 28 to the occupant of the vehicle 20, e.g., to facilitate disengagement of a clip 36 from the buckle 28.

With reference to FIG. 1, the vehicle 20 may be any suitable type of ground vehicle, e.g., a passenger or commercial automobile such as a sedan, a coupe, a truck, a sport utility, a crossover, a van, a minivan, a taxi, a bus, etc. The vehicle 20 can include a system or systems for autonomously or semi-autonomously operating the vehicle 20, e.g., an advanced driver assist system ADAS for speed control, lane-keeping, etc.

The vehicle 20 includes a propulsion system that translates energy into motion of the vehicle 20, e.g., in response to an instruction from the computer 30 and/or in response to an operator input, such as to an accelerator pedal. For example, the propulsion system may include a conventional powertrain having an internal-combustion engine coupled to a transmission that transfers rotational motion to wheels; an electric powertrain having batteries, an electric motor, and a transmission that transfers rotational motion to the wheels; a hybrid powertrain having elements of the conventional powertrain and the electric powertrain; or any other type of structure for providing motion to the vehicle 20. The propulsion system may be in communication with the computer 30.

The vehicle 20 may be in a park mode or a drive mode. The vehicle 20 in the park mode is stationary and torque from the propulsion system is not provided to wheels of the vehicle 20. For example, a parking pawl of a transmission of the propulsion system may be engaged, one or more clutches of the transmission may be disengaged to inhibit transfer of torque, a parking brake may be engaged, etc. The vehicle 20 in the drive mode may be movable, e.g., in a forward or reverse direction, and torque from the propulsion system is providable to wheels of the vehicle 20. For example, the parking pawl may be disengaged, one or more clutches may be engaged to provide transfer of toque, the parking brake may be disengaged, etc.

The vehicle 20 includes a body and a frame. The body and the frame may be of a unibody construction in which the frame is unitary with a vehicle body including frame rails, pillars, roof rails, etc. As another example, the body and frame may have a body-on-frame construction also referred to as a cab-on-frame construction in which the body and frame are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc.

The vehicle body defines a passenger compartment to house occupants, if any, of the vehicle 20. The passenger compartment may extend across the vehicle 20, i.e., from one side to the other side of the vehicle 20. The passenger compartment includes a front end and a rear end with the front end being in front of the rear end during forward movement of the vehicle 20.

One or more seats 22 may be supported by the vehicle 20 in the passenger compartment. Each seat 22 includes the seatback 26 and the seat bottom 24. The seatback 26 may be supported by the seat bottom 24 and may be stationary or movable relative to the seat bottom 24. The seat bottom 24 includes a top surface 32. An occupant of the seat 22 may sit upon the top surface 32 of the seat bottom 24. The seatback 26 and the seat bottom 24 may be adjustable in multiple degrees of freedom. Specifically, the seatback 26 and the seat bottom 24 may themselves be adjustable, in other words, adjustable components within the seatback 26 and/or the seat bottom 24, and/or may be adjustable relative to each other. The seatback 26 and the seat bottom 24 may each include a frame and a covering supported on the frame. The frame may include tubes, beams, etc. Specifically, the frame includes a pair of upright frame members. The frame may be of any suitable plastic material, e.g., carbon fiber reinforced plastic CFRP, glass fiber-reinforced semi-finished thermoplastic composite organosheet, etc. As another example, some or all components of the frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the seatback 26 frame and may be foam or any other suitable material.

The vehicle 20 includes or more seatbelt assemblies 34. The seatbelt assembly 34 may include a seatbelt retractor and a webbing retractably payable from the seatbelt retractor. The seatbelt assembly 34 may include an anchor coupled to the webbing, and the clip 36 that engages the buckle 28. The seatbelt assembly 34 may be disposed adjacent a seating area SA of the seat 22. The seatbelt assembly 34, when fastened, secures the driver or a passenger of the vehicle 20 against movement that may result during a collision or a sudden stop. The webbing may extend continuously from the seatbelt retractor to the anchor. For example, one end of the webbing feeds into the seatbelt retractor, and the other end of the webbing is fixed to the anchor. The anchor may, for example, be fixed to the seat 22. Alternatively, the anchor may be fixed to the vehicle 20 body, e.g., the B-pillar, the floor, etc. The anchor may be attached to the seat 22 in any suitable manner, e.g., with fasteners. The webbing may be fabric, e.g., polyester. The clip 36 slides freely along the webbing and, when engaged with the buckle 28, divides the webbing into a lap band and a shoulder band. The seatbelt assembly 34 may include a D-ring engaged with the webbing. For example, the webbing may freely slide through the D-ring. In other words, the webbing may extend from the anchor through the D-ring to the seatbelt retractor. The D-ring may be spaced from the seatbelt retractor. For example, the D-ring may be disposed between the seatbelt retractor and the roof. As another example, the seatbelt retractor may be adjacent to the floor and the D-ring may be adjacent to the roof. The D-ring may be fixed to the vehicle 20 body, e.g., the B-pillar. The seatbelt assembly 34 may be a three-point harness, meaning that the webbing is attached at three points around the occupant when fastened. The seatbelt assembly 34 may, alternatively, include another arrangement of attachment points.

Figure 2:
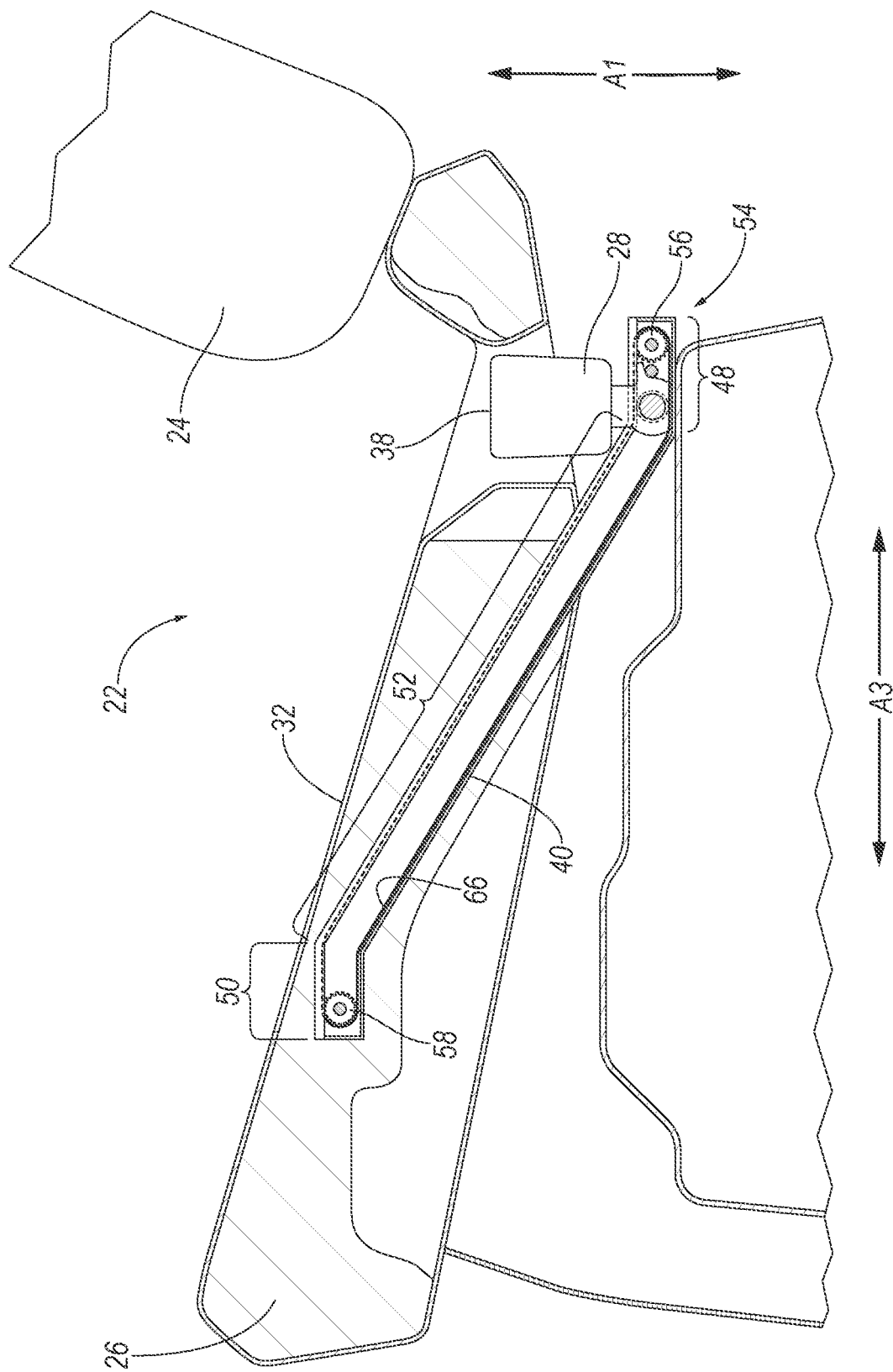
FIG. 2 is a cross section of a seat of the vehicle with a buckle of one of the seatbelt assemblies in a retracted position.
Figure 3:
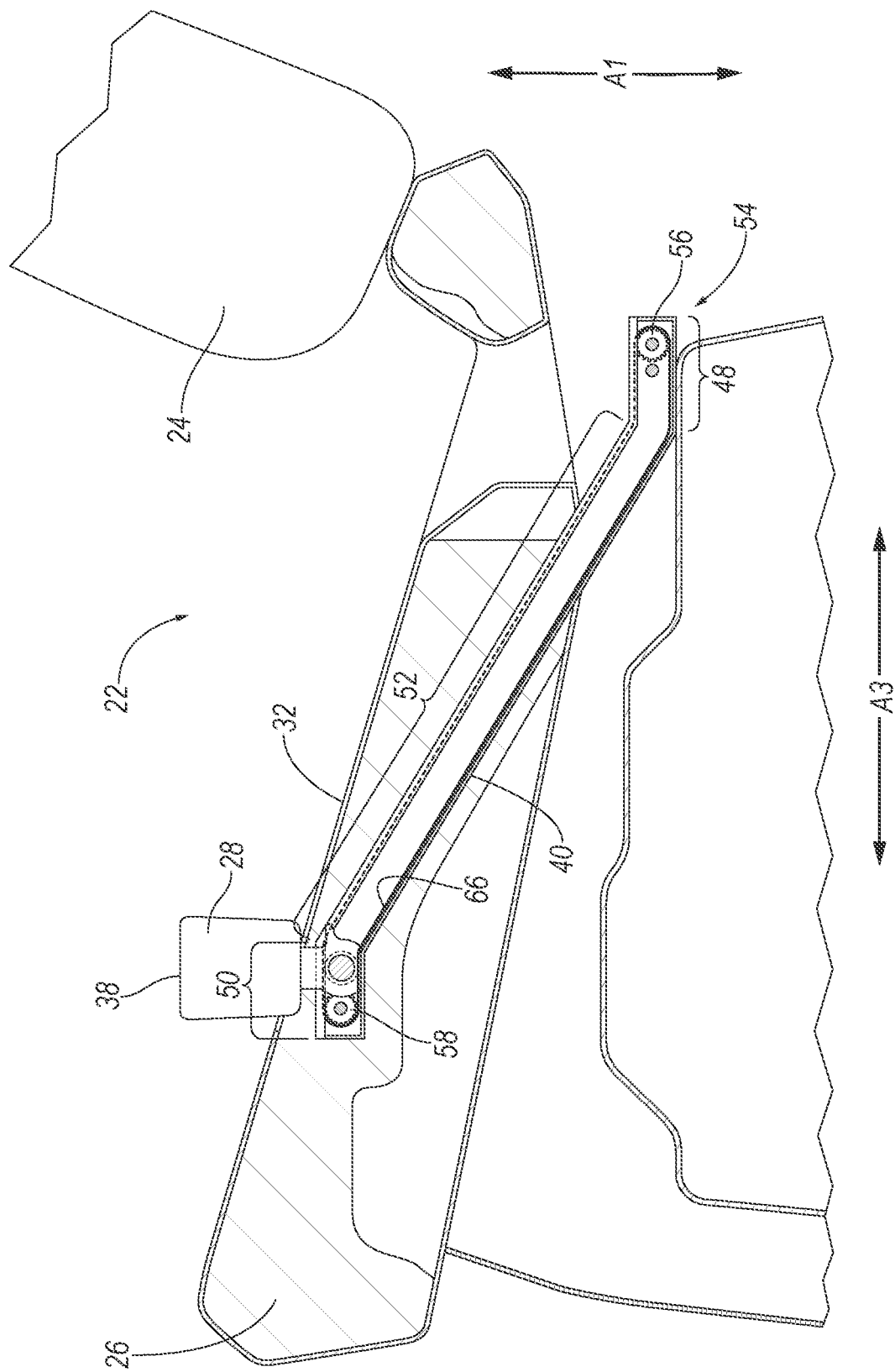
FIG. 3 is a cross section of the seat of the vehicle with the buckle of one of the seatbelt assemblies in a deployed position.
Figure 4:
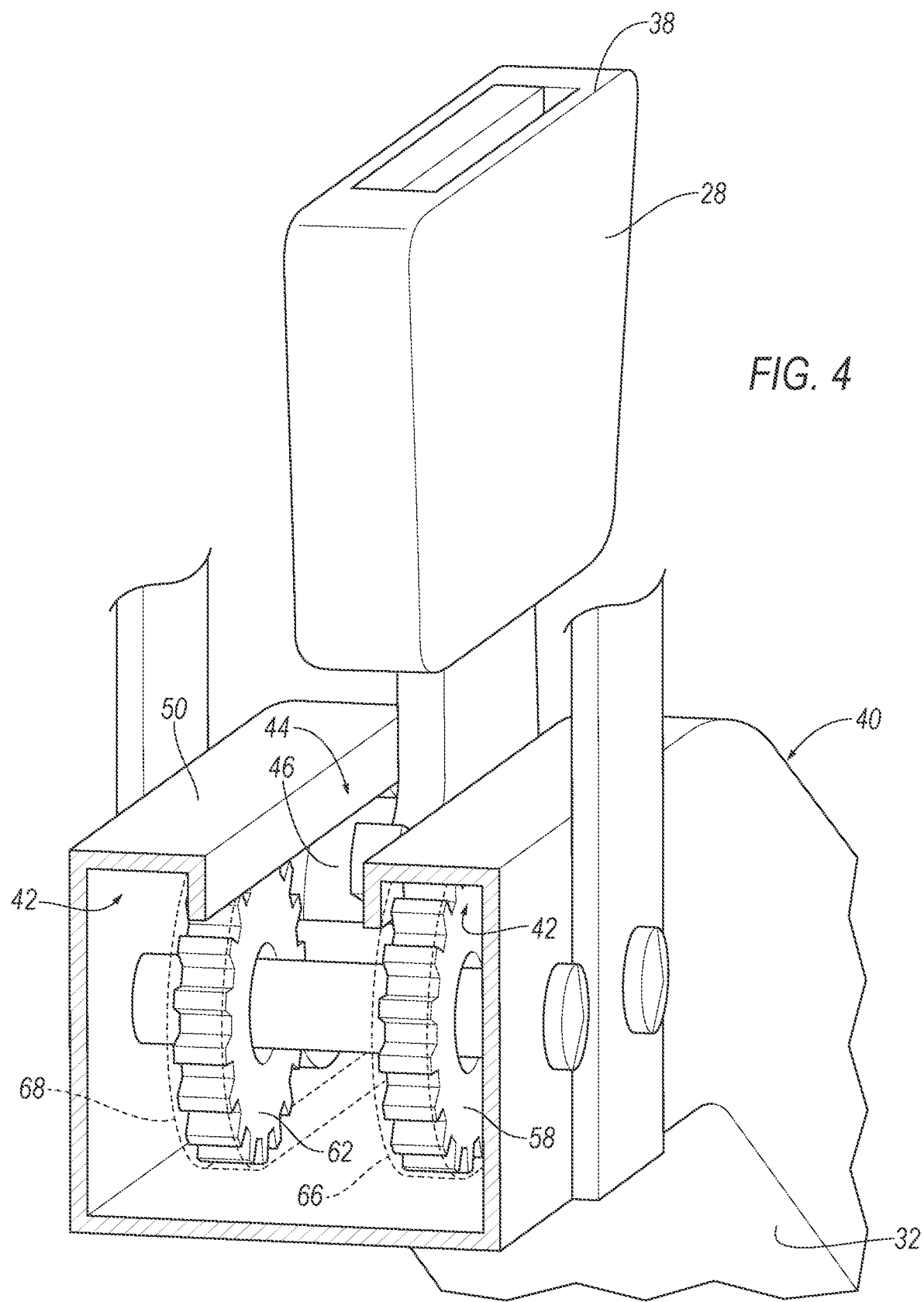
FIG. 4 is perspective view of a portion of a track supporting the buckle in the deployed position.
Figure 5:
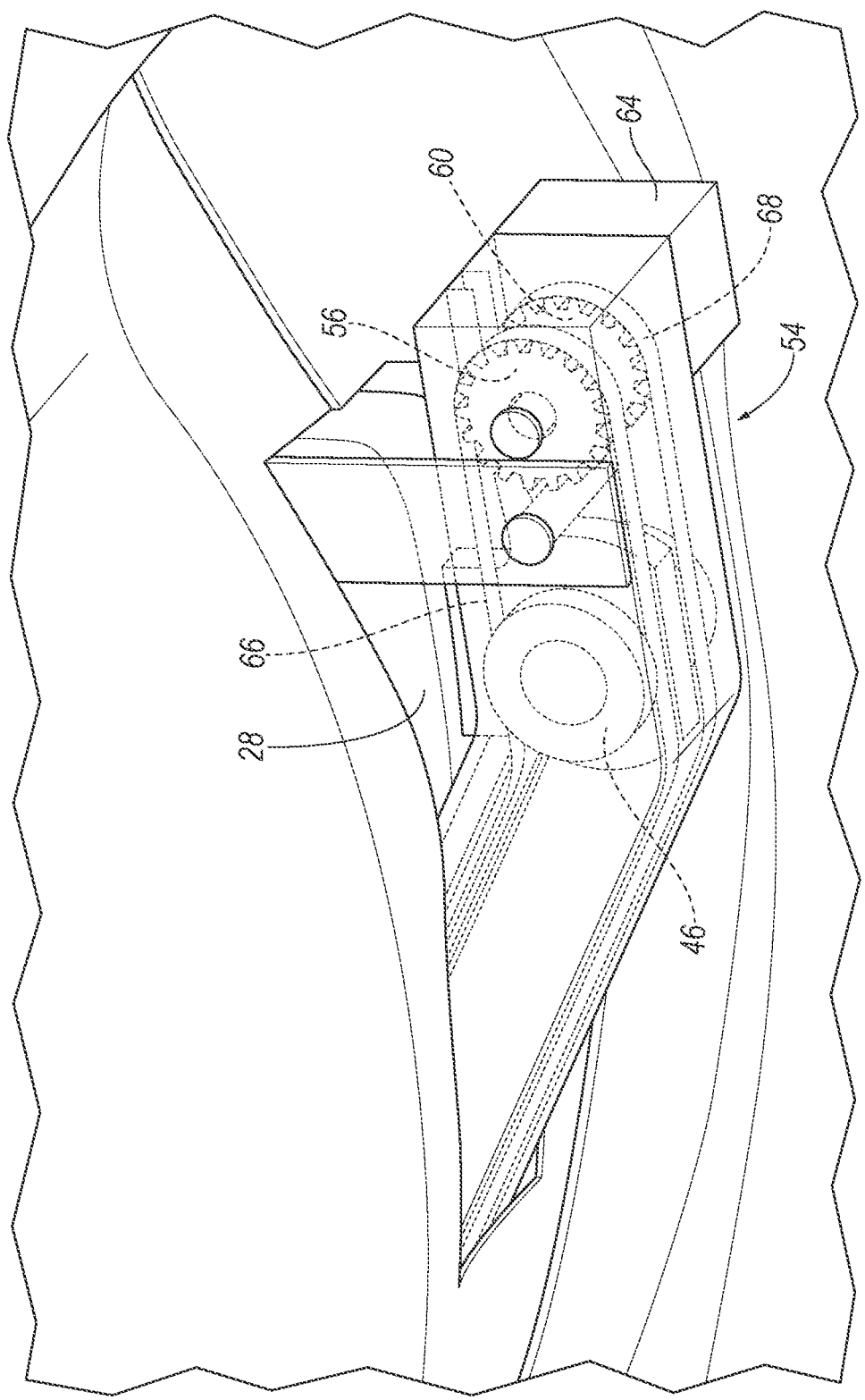
FIG. 5 is perspective view of a portion of a track supporting the buckle in the retracted position.

The buckle 28 of the seatbelt assembly 34 is movable relative to the seat bottom 24 from the retracted position, shown in FIGS. 2, to the deployed position, shown in FIG. 3, and vice versa. The buckle 28 at the retracted position may enhance comfort of the occupant of the seat 22, position the clip 36 relative to the occupant to control kinematics of the occupant, etc. The buckle 28 at the deployed position may increase ease of the occupant to engage or disengage the clip 36 of the seatbelt assembly 34 with or from the buckle 28, e.g., by presenting the buckle 28 to the occupant. The buckle 28 at the retracted position is at the seatback 26, and at the deployed position is spaced from the seatback 26. In other words, the buckle 28 at the retracted position is closer to the seatback 26 than at the deployed position. The buckle 28 in the retracted position may be closer to the top surface 32 of the seat bottom 24 than in the deployed position along a seat-vertical axis A1. For example, a top edge 38 of the buckle 28 in the retracted position may be generally flush with the top surface 32 of the seat bottom 24, and the top edge 38 of the buckle 28 in the deployed position may be spaced from the top surface 32 along the seat-vertical axis A1.

With reference to FIGS. 2-5, the buckle 28 may be movable along a track 40 fixed relative to the seat 22. For example, the track 40 may be fixed to the frame of the seat bottom 24. The track 40 may include channels 42 or other suitable structure for permitting movement of the buckle 28 parallel to the track 40 and inhibiting movement of the buckle 28 transverse to the track 40. More specifically, the track 40 may include an open slot 44 extending along a top of the track 40. The channels 42 may be on opposite sides of the slot 44, e.g., along a seat-lateral axis A2. The buckle 28 may be operatively coupled to the track 40 to move there along. For example, rollers 46 or other suitable structure maybe connected to the buckle 28 and engaged with the channels 42, and the buckle 28 may extend from within the track 40 outward through the slot 44 to above the top of the track 40. The track 40 is extended and is elongated from a first end 48 to a second end 50. The buckle 28 at the retracted position may be at the first end 48 and the buckle 28 at the deployed position may be at the second end 50. The first end 48 may be at the seatback 26 and the second end 50 may be spaced from the seatback 26. In other words, the track 40 may extend from the first end 48 away from the seatback 26 to the second end 50. The first end 48 may be below the second end 50, e.g., relative to the seat-vertical axis A1. The second end 50 may be closer to the top surface 32 of the seat bottom 24 than the first end 48. The track 40 may extend from the first end 48 to the second end 50 transverse to a seat-longitudinal axis A3 and the seat-vertical axis A1. The track 40 at the first end 48 and at the second end 50 may extend along, e.g., parallel to, the seat-longitudinal axis A3 and perpendicular to the seat-vertical axis A1. The track 40 may include a middle portion 52 between and transverse to the track 40 at the first end 48 and the second end 50. The middle portion 52 may extend from the first end 48 to the second end 50. The first end 48, the second end 50, and the middle portion 52 may each be linear.

The actuator 54 is operatively coupled to the buckle 28 to move the buckle 28 from the retracted position to the deployed position, e.g., in response to a command from the computer 30. For example, the actuator 54 may include gears 56, 58, 60, 62 at the first end 48 and the second end 50 of the track 40. For example, the actuator 54 may include a first gear 56 at the first end 48 and a second gear 58 at the second end 50. The first gear 48 and the second gear 50 may be on one side of the slot 44, e.g., within one of the channels 42. The actuator 54 may include a third gear 60 at the first end 48 a fourth gear 62 at the second end 50. The third gear 60 and fourth gear 62 may at an opposite side of the slot 44, e.g., within the other of the channels 42. The actuator 54 may include a motor 64 operatively coupled to both the first gear 56 and the third gear 60 to rotate both the first gear 56 and the third gear 60, e.g., via shafts, gears, or any other suitable structure. The motor 64 may by supported by, e.g., fixed to, the seat bottom 24. The actuator 54 may include a first belt 66 engaged with the first gear 56 and the second gear 58 and a second belt 68 engaged with the third gear 60 and the fourth gear 62. The buckle 28 may be fixed relative to the belts. Torque from the motor 64 may rotate the gears and move the belts. Movement of the belts may move the buckle 28 along the track 40, e.g., toward the first end 48 or the second end 50 depending on a direction of rotation of the gears 56, 58, 60, 62 and movement direction of the belts 66, 68. As another example, the actuator 54 may be a linear actuator (not shown) that changes lengths between ends fixed to the seat 22 and buckle 28 respectively. The actuator 54 may include any suitable mechanical, electrical, and/or hydraulic structure that is capable of moving the buckle 28 to from the retracted position to the deployed position, and vice versa.

Figure 6:
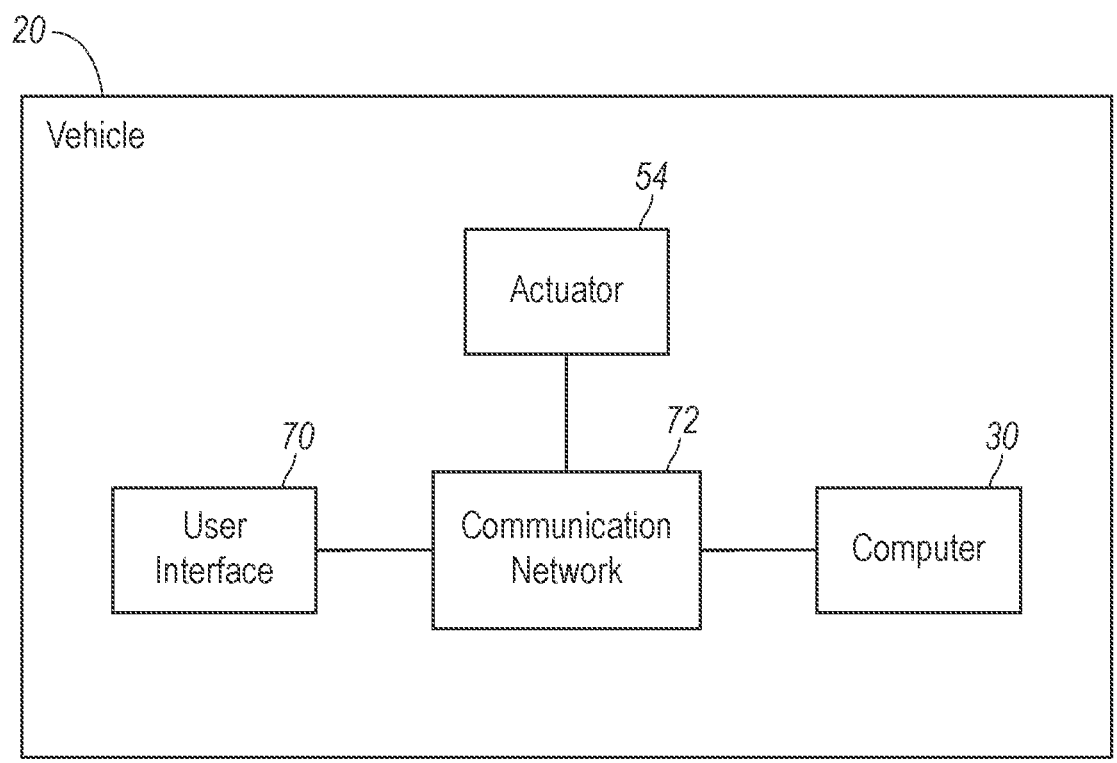
FIG. 6 is block diagram of components of the vehicle.

With reference to FIG. 6, the vehicle 20 includes at least one user interface 70 that receives information from an occupant of the vehicle 20. The user interface 70 may be located, e.g., on an instrument panel in a passenger cabin of the vehicle 20, a steering wheel column, a center column between a pair of the seats 22, or wherever may be readily seen by the occupant. The user interface 70 may include includes buttons, levers (such as a gear selection level), knobs, keypads, and so on for receiving information from the occupant.

The computer 30 includes a processor and a memory storing instructions executable by the processor. The memory includes one or more forms of computer 30 readable media, and stores instructions executable by the computer 30 for performing various operations, including as disclosed herein and including the method of a process 700 (described below). For example, the computer 30 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. The computer may be, for example, a restraints control module. In another example, the computer 30 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 30. The memory can be of any type, e.g., hard disk drives, solid state drives, servers, or any volatile or non-volatile media. The memory can be a separate device from the computer 30, and the computer 30 can retrieve information stored by the memory via a network in the vehicle 20, e.g., over a CAN bus, a wireless network, etc. Alternatively or additionally, the memory can be part of the computer 30, e.g., as a memory of the computer 30. The computer 30 may include programming to operate one or more of vehicle brakes, propulsion e.g., control of acceleration in the vehicle 20 by controlling one or more of an internal combustion engine, electric motor, hybrid engine, etc., steering, climate control, interior and/or exterior lights, etc., as well as to determine whether and when the computer 30, as opposed to a human operator, is to control such operations. Additionally, the computer 30 may be programmed to determine whether and when a human operator is to control such operations. The computer 30 may include or be communicatively coupled to, e.g., via a vehicle network such as a communications bus as described further below, more than one processor, e.g., included in components such as sensors, electronic control units (ECUs) or the like included in the vehicle 20 for monitoring and/or controlling various vehicle components, e.g., a powertrain controller, a brake controller, a steering controller, etc.

The computer 30 is generally arranged for communications on a communication network 72 that can include a bus in the vehicle 20 such as a controller area network CAN or the like, and/or other wired and/or wireless mechanisms. Via the communication network 72, the computer 30 may transmit messages to various devices in the vehicle 20, and/or receive messages (e.g., CAN messages) from the various devices, e.g., the actuator 54, the user interface 70, etc. Alternatively or additionally, in cases where the computer 30 includes a plurality of devices, the communication network 72 may be used for communications between devices represented as the computer 30 in this disclosure. Further, as mentioned below, various controllers 46 and/or sensors may provide data to the computer 30 via the communication network 72.

The computer 30 is programmed to, i.e., the memory stores instructions executable by the processor to, receive the indication that the occupant of the seat 22 will exit the vehicle 20. The indication is data or other electronic information provided to the computer, e.g., via the communication network 72, that specifies a detection of an event that is correlated with the occupant exiting the vehicle 20. The indication may include data or other electronic information from the user interface 70, e.g., data indicating detection of a turn of a key or press of a button to power down the vehicle, data indicating a press of a button or movement of a gear selection nob to place the vehicle 20 in the park mode, etc. The indication may include data or other information from a navigation system of the vehicle 20, e.g., indicating that the vehicle 20 has stopped at a specified destination. The indication may include information from a sensor (such as a switch, contact, or proximity sensor) of the vehicle 20 indicating that a physical component of the vehicle 20 is a certain position correlated with exiting the vehicle 20, e.g., information from a switch indicating that a door of the vehicle 20 is at an open position.

The computer 30 is programmed to determine what mode the vehicle 20 is in, e.g., that the vehicle 20 is in the park mode or in the drive mode. The computer 30 may determine the vehicle 20 is in the park mode or the drive mode based on information from the user interface 70. For example, the computer 30 may receive information from the user interface 70, e.g., via the communication network 72, indicating the drive mode or the park mode, e.g., depending on a position of the gear selection knob of the user interface 70. As another example, the computer 30 may determine the vehicle 20 is in the park mode or the drive mode based on a selection of one of such modes by the computer 30, e.g., operating in the autonomous mode.

The computer 30 is programmed to move the buckle 28 to the deployed position and to the retracted position. The computer 30 may move the buckle 28, for example, by sending a command to the actuator 54 via the communication network 72. The command may instruct, for example, movement of the buckle 28 from the retracted position to the deployed position, or from the deployed position to the retracted position. The command may, for example, specify operation of the motor 64 in a first direction or an opposite second direction, e.g., depending on if the command is to move the buckle 28 to the deployed position or the retracted position. The computer 30 may command the actuator 54 to move the buckle 28 to the deployed position in response to determining that the vehicle 20 is in the park mode. The computer 30 may command the actuator 54 to move the buckle 28 from the deployed position to the retracted position in response to determining that the vehicle 20 is in the drive mode.

With reference to FIG. 7, a flow chart illustrating the process 700 for controlling the buckle 28 is shown. The process 700 starts at a block 710 where the computer 30 collects data, e.g., from the user interface 70, etc., via the communication network 72. The computer 30 may collect such data continuously, at intervals (e.g., every 100 milliseconds), etc. The computer 30 may collect such data throughout the process.

At a block, 720 the computer 30 monitors the collected data for receipt of an indication that an occupant of the seat will exit the vehicle 20. Upon receiving of the indication that the occupant of the seat will exit the vehicle 20, the computer 30 moves to a block 730. Else, the computer 30 may move to a block 740.

At the block 730 the computer 30 commands the actuator 54 to move the buckle 28 from the retracted position to the deployed position. For example, the computer 30 may transmit a command to the motor 64 of the actuator 54 specifying rotation of the motor 64 in a certain direction. After the block 730 the computer 30 may move to the block 740

At the block, 740 the computer 30 determines whether the vehicle 20 is in the drive mode. For example, the computer 30 may determine the vehicle 20 is in the drive mode in response to receiving information from the user interface 70 indicating the drive mode. Upon determining the vehicle 20 is in the drive mode, the computer 30 moves to a block 750. Else, the computer 30 may return to the block 720. Alternately, the process 700 may end.

At the block 750 the computer 30 commands the actuator 54 to move the buckle 28 from the deployed position to the retracted position. For example, the computer 30 may transmit a command to the motor 64 of the actuator 54 specifying rotation of the motor 64 in a certain direction, e.g., opposite the certain direction of the block 730. After the block 750, the process 700 may end. Alternately, the computer 30 may return to the block 720.

Computer executable instructions may be compiled or interpreted from computer programs created using a variety of programming languages and/or technologies, including, without limitation, and either alone or in combination, Java, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

With regard to the processes, systems, methods, etc. described herein, it should be understood that, although the steps of have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain examples.

The adjectives first, second, etc., are used throughout this document as identifiers and, unless explicitly stated otherwise, are not intended to signify importance, order, or quantity.

Use of in response to, based on, and upon herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
a seat having a seat bottom and a seatback;
a buckle movable from a retracted position at the seatback to a deployed position spaced from the seatback;
an actuator operatively coupled to the buckle to move the buckle from the retracted position to the deployed position;
a track elongated from a first end to a second end;
the actuator including a first gear at the first end, a second gear at the second end, and a belt engaged with the first gear and the second gear; and
a computer having a processor and a memory storing instructions executable by the processor to:
receive an indication that an occupant of the seat will exit the vehicle; and
in response to receiving the indication that the occupant of the seat will exit the vehicle, command the actuator to move the buckle from the retracted position to the deployed position.

2. The vehicle of claim 1, wherein the buckle at the retracted position is at the first end and the buckle at the deployed position is at the second end.

3. The vehicle of claim 1, wherein the first end is below the second end relative to a seat-vertical axis.

4. The vehicle of claim 1, wherein the track extends from the first end to the second end transverse to a seat-longitudinal axis and a seat-vertical axis.

5. The vehicle of claim 4, wherein the track at the first end and at the second end extends parallel to the seat-longitudinal axis.

6. The vehicle of claim 1, wherein the track extends from the first end away from the seatback to the second end.

7. The vehicle of claim 1, wherein the buckle is fixed relative to the belt.

8. The vehicle of claim 7, wherein the actuator includes a third gear at the first end, a fourth gear at the second end, and a second belt engaged with the third gear and the fourth gear.

9. The vehicle of claim 8, wherein the actuator includes a motor operatively coupled to both the first gear and the third gear to rotate both the first gear and the third gear.

10. The vehicle of claim 1, wherein the seat bottom includes a top surface and the buckle in the retracted position is closer to the top surface of the seat bottom than in the deployed position.

11. The vehicle of claim 1, wherein the instructions include instructions to determine that the vehicle is in a drive mode, and in response to determining that the vehicle is in the drive mode, command the actuator to move the buckle from the deployed position to the retracted position.

12. A vehicle, comprising:
a seat having a seat bottom and a seatback;
a buckle movable from a retracted position at the seatback to a deployed position spaced from the seatback;
a track elongated from a first end to a second end, the buckle at the retracted position being at the first end and the buckle at the deployed position being at the second end; and
an actuator operatively coupled to the buckle to move the buckle from the retracted position to the deployed position, the actuator including a first gear at the first end, a second gear at the second end, and a belt engaged with the first gear and the second gear.

13. The vehicle of claim 12, wherein the first end is below the second end relative to a seat-vertical axis.

14. The vehicle of claim 12, wherein the track extends from the first end to the second end transverse to a seat-longitudinal axis and a seat-vertical axis.

15. The vehicle of claim 14, wherein the track at the first end and at the second end extends along the seat-longitudinal axis.

16. The vehicle of claim 12, wherein the track extends from the first end away from the seatback to the second end.

17. The vehicle of claim 12, wherein the buckle is fixed relative to the belt.

18. The vehicle of claim 17, wherein the actuator includes a third gear at the first end, a fourth gear at the second end, and a second belt engaged with the third gear and the fourth gear.

19. The vehicle of claim 12, further comprising a computer having a processor and a memory storing instructions executable by the processor to:
receive an indication that an occupant of the seat will exit the vehicle;
in response to receiving the indication that the occupant of the seat will exit the vehicle, command the actuator to move the buckle from the retracted position to the deployed position;
determine that the vehicle is in a drive mode; and
in response to determining that the vehicle is in the drive mode, command the actuator to move the buckle from the deployed position to the retracted position.

* * * * *